United States Patent
Ross

(10) Patent No.: US 6,801,494 B2
(45) Date of Patent: Oct. 5, 2004

(54) MULTIPLE SECTIONS FOR DUAL-LAYER OPTICAL RECORDING MEDIUM

(75) Inventor: Kevin Ross, Sunnyvale, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 330 days.

(21) Appl. No.: 09/999,005

(22) Filed: Oct. 31, 2001

(65) Prior Publication Data

US 2003/0081535 A1 May 1, 2003

(51) Int. Cl.$^7$ .................................................. G11B 7/24
(52) U.S. Cl. ................................ 369/275.3; 369/275.1
(58) Field of Search ........................... 369/275.3, 275.1, 369/94, 30.2, 30.06, 30.1, 53.37, 47.23; 380/201, 202, 203

(56) References Cited

U.S. PATENT DOCUMENTS

| | | | | |
|---|---|---|---|---|
| 5,696,743 A | * | 12/1997 | Kawasaki | 369/30.13 |
| 5,781,516 A | * | 7/1998 | Yamada | 369/30.13 |
| 5,881,032 A | * | 3/1999 | Ito et al. | 369/30.1 |
| 5,920,527 A | * | 7/1999 | Aoki | 369/30.15 |
| 5,930,225 A | * | 7/1999 | Ishida et al. | 369/275.1 |
| 6,108,291 A | * | 8/2000 | Ono et al. | 369/47.11 |
| 6,137,766 A | * | 10/2000 | Utsumi | 369/275.1 |
| 6,141,299 A | * | 10/2000 | Utsumi | 369/53.37 |
| 6,370,091 B1 | * | 4/2002 | Kuroda | 369/30.08 |

FOREIGN PATENT DOCUMENTS

| EP | 0 817 195 | 1/1998 |
|---|---|---|
| EP | 1 158 517 | 11/2001 |

* cited by examiner

Primary Examiner—Tan Dinh
(74) Attorney, Agent, or Firm—Peter Zawilski

(57) ABSTRACT

A optical storage disk provides multiple logical disks without the need to physically alter the structure of the optical storage disk. According to one example embodiment of the present invention, a dual-layer data disk is adapted to store data in each of two layers readable by an optical disk reader. A first region of the disk includes data recorded for a first logical disk, and a second region is adapted to store data for a second logical disk, and the first and second regions are located on the two layers. Each of the data logical disks includes a lead-in region and a lead-out region and for data therebetween traversing each of the two layers. The lead-out region of the first logical disk stores pointing data which points to the lead-in region of second logical disk, and the logical disks are not necessarily physically contiguous.

24 Claims, 2 Drawing Sheets

MULTIPLE SECTIONS FOR DUAL-LAYER OPTICAL RECORDING MEDIUM

FIELD OF THE INVENTION

The present device relates generally to portable storage media and more particularly to optical storage arrangements and systems.

BACKGROUND OF THE INVENTION

One of the most common optical disc storage systems used with data processing systems is the compact disc (CD) disc. A CD provides a read only optical storage medium onto which data is written only once and then read many times. A CD disc can contain a mixed stream of digital image, audio, video, and/or text data. The compact disc typically has a lead-in area, a program area and a lead-out area. The lead-in area is located on the inside of the disc and the lead-out area is closer to the perimeter of the disc. The program area of the disc usually contains digital audio or data that is read by the CD player or the CD-ROM drive.

The CD standard also incorporates the concept of multiple session media. In one example, the first session is a digital audio session and the second session is a "data session." The data session contains content readable only on a CD-ROM drive and not by a CD player. This recording approach is an example of a more-recent storage media being backwards compatible with existing CD players, providing new data session features to new-generation storage media players. In moving between sessions recorded on the compact disc, such as from the digital-audio session to the data session, the optical reader uses a pointer located in the current session that indicates where the next session starts. The final session on a disc may include a "next-session" pointer; if this pointer exists, it points to a non-existent session that may be recorded at a later date. If there is no next-session pointer, then no additional sessions may be appended.

Even though CDs are a popular choice for consumers, the increasing storage requirements of today's complex graphics and live video are pressuring manufacturers to favor the new, digital versatile disk read-only-memory (DVD-ROM) disks. DVDs operate at higher speeds than their predecessor and provide a storage capacity of about 4.7 GB to 17 GB, which is at least eight times the storage capacity of a typical CD. DVDs have increased dramatically in popularity due to the DVD's capability to store most feature length films on one disk. However, as movie and video game graphics continue to increase in complexity, the on-going challenge is to provide ever increasing amounts of storage space on the DVD while preserving the current DVD packaging size.

SUMMARY OF THE INVENTION

Various aspects of the present invention are directed to increasing the programming versatility of DVDs. The present invention is exemplified in a number of implementations and applications, some of which are summarized below.

According to an example embodiment of the present invention, a dual-layer data disk is adapted to store data in each of two layers, which is readable by an optical disk reader. The disk includes: a first data region for a first logical disk and a second data region for a second logical disk. Each of the first and second regions is arranged on each of the two layers, and each of the logical disks includes a lead-in region and a lead-out region and is adapted for data therebetween traversing each of the two layers. The lead-out region of the first logical disk stores pointing data that points to the lead-in region of second logical disk.

Various applications of the present invention are directed to OPT (Opposite Track Path) and PTP (Parallel Track Pitch) formats. For example, for OPT, there is one logical disk that is split across the two layers on the disk, plus there is an intermediate (or middle) region at the splicing-point of the data; and for PTP, there are two logical disks, two lead-ins, two lead-outs and no intermediate regions.

In related embodiment of the present invention, the lead-out region of the first logical disk is adapted for storing encrypted pointing data which, when unencrypted, points to the lead-in region of second data logical disk. The second region includes data that is application specific, and the first region includes data for "general consumption" across a range of application systems. The first region can also be data-writable for post-production recording of data as another data logical disk.

The above summary is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the following detailed description of various embodiments of the invention in connection with the accompanying drawing, in which.

Figure 1:
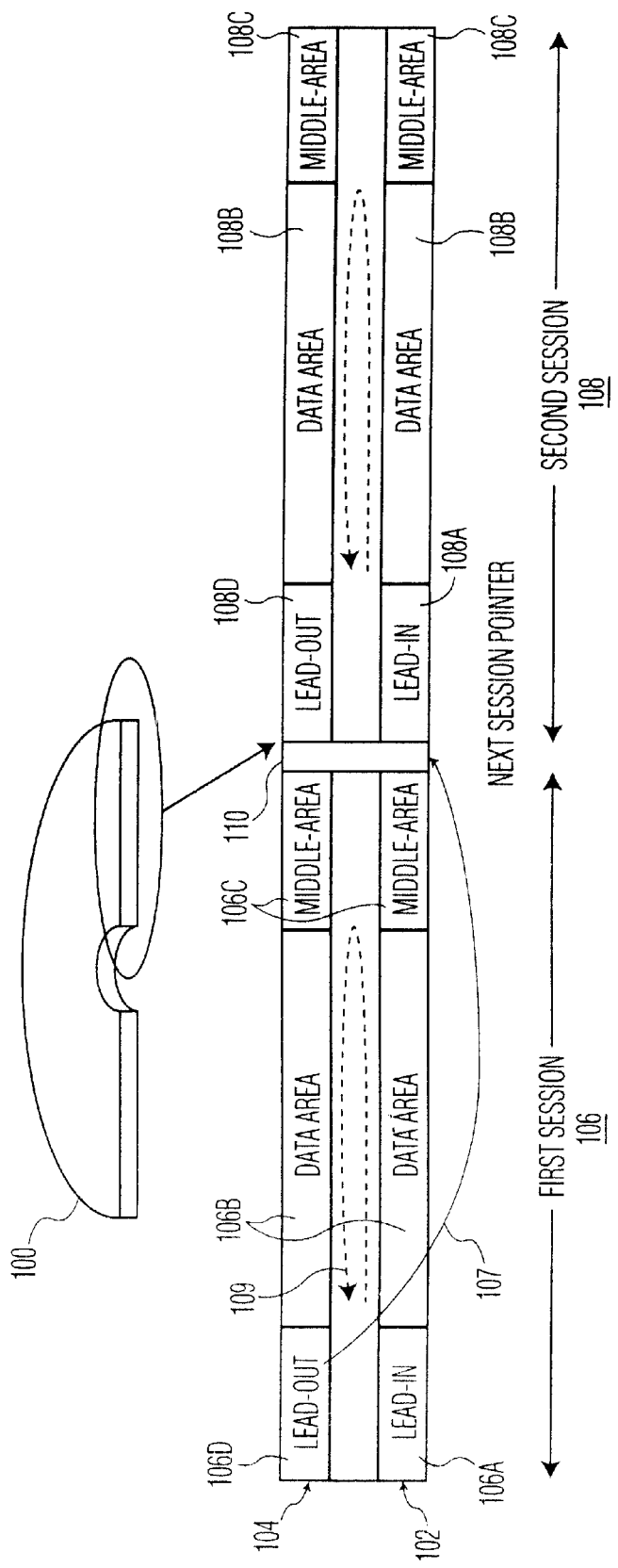
FIG. 1 is an example dual layer arrangement, optical storage disk made in accordance with an example embodiment of the present invention.

While the invention is amenable to various modifications and alternative forms, specifics thereof have been shown by way of example in the drawing and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to optical storage disk applications benefiting from enhanced storage capability and programming versatility, for example, in DVD type media and CD media for encrypted logical disk pointers. While the present invention is not necessarily limited to such applications, an appreciation of various aspects of the invention is best gained through a discussion of various examples in this context.

According to an example embodiment of the present invention, a dual layer, optical storage disk is configured to provide at least a first digital data logical disk and a second digital data logical disk. The two logical disks are immediately adjacent to each other but are viewable by an optical reader as though they are two distinct disks. Each of the logical disks includes a lead-in region, a lead-out region, a middle region and a data region. Each of the logical disks is also configured to be read in an OTP mode. In the OTP mode, the disk is read from the lead-in region on the inside lower disk layer and across the data region to the middle-region at the perimeter. Reading continues along the upper disk layer and back across the disk in the opposite direction to the lead-out region. This application is also applicable to Parallel Track Pitch (PTP) media, wherein the disk is viewed as two independent data areas (or logical disks) read from the inner to the outer diameter.

In this particular example, the first data logical disk is visible by the optical reader but the second data logical disk is found using a pointer that indicates where the lead-in region of the second logical disk is located. The pointer is located in the lead-out region of the first logical disk and is detectable by an optical reader configured to read these (and possibly other) logical disks and which can collectively be used to store a particular data set. According to the present invention, new DVD disks can be developed to include multiple logical disks that are viewed by older generation optical readers as only having a single logical disk. Newer optical readers are configurable to read both logical disks and to effortlessly switch between logical disks on demand.

In a related example embodiment, only a first logical disk includes recorded data. Additional logical disks can now be subsequently added to a DVD disk that once was considered a commercial end product. When adding the second logical disk, a pointer is enabled or programmed in the lead-out region of the previously programmed logical disk of the DVD end product to locate the newly added logical disk(s). Another example embodiment involves adding the first and subsequent logical disks to an empty/blank (or partially empty/blank) disk.

Referring now to the figures, FIG. 1 is an example dual layer optical storage disk 100 made in accordance with an example embodiment of the present invention. In this particular example, a cross section of disk 100 illustrates that disk 100 includes a first optical disk layer 102 that is adjacent to a second optical disk layer 104. Disk 100 is divided into a first logical disk 106 and a second logical disk 108 with a separating portion 110 that is transversal to layers 102 and 104. First logical disk 106 includes a lead-in region 106A, a data and middle regions 106B and 106C that are transversal to layers 102 and 104, respectively, and a lead-out region 106D. In this example, first logical disk 106 further includes a pointer 107 that is located within lead-out region 106D. The lead-out region stores the pointing data of pointer 107 that is readable by an optical disk reader to locate the lead-in region of the next logical disk. In this example embodiment, the pointing data of pointer 107 directs the optical disk reader to lead-in region 108A of second logical disk 108 that is adjacent portion 110.

In this example embodiment, disk 100 is read in an Opposite Track Path (OTP) mode as illustrated by arrow 109. As shown, reading of disk 100 in the OTP mode starts at lead-in region 106A and moves across data region 106B to middle region 106C of layer 102. There is no data in the middle region, which is a pseudo lead-out for the lower layer and a pseudo lead-in for the upper layer. Thus, using splicing point for the data regions, reading continues transversally through middle region 106C up to layer 104 and back across data region 106B to lead-out region 106D. Depending on the type of optical disk reader used, the reading session, in this example, ends because logical disk 108 is not visible to the disk reader.

In a related embodiment, even though second logical disks 108 is visible to the disk reader, the device cannot locate lead-in region 108A because the pointing data of pointer 107 is encrypted within lead-out region 106D. To decode the pointing data, it is necessary to provide a key to the disk reader that assists in finding the pointer. In newer generation disk readers, the key may be automatically programmed into the system such that the user is oblivious to the finding of pointer 107. Once the pointing data is decoded, pointer 107 points to lead-in region 108A to commence reading of logical disk 108.

The pointer 107 is encrypted to point to the physical address of the next possible logical disk. In this example embodiment, pointer 107 is encrypted to locate the lead-in region 108. Generally, for "N" logical disks, logical disk No. 1 points to logical disk No. 2, logical disk No. 2 points to logical disk No. 3, etc. In an example embodiment having three logical disks on one disk, the pointer is encrypted to point to the physical address of the lead-out region of the third logical disk. From the third logical disk, the pointer is encrypted to identify the physical address of the lead-out region of the second logical disk. Therefore, decoding the pointer assists in directing the optical reader to read the disk properly and detect all recorded logical disks.

In another example embodiment, additional logical disks are added to a DVD disk that is a commercially finished product or recorded to a blank disk. The lead-out region of the previously programmed logical disk is programmed with the pointing data of the pointer to include the physical address of the next logical disk, thereby directing the optical reader to the newly added logical disk. Subsequently added logical disks include pointing data in their lead-out regions and the physical address of the next logical disk.

The approach of the present invention alleviates the burdensome task in the prior art of encrypting all of the data in the additional logical disks. Software design for new generation optical readers is facilitated in not having to include filtering algorithms to decode encrypted logical disks. The present approach is also advantageous to manufacturers of software games, optical disk readers and DVDs, in permitting manufacturers to control access to individual logical disks via the read/player. In one example embodiment, first logical disk 106 is visible to standard players, while logical disks 106 and 108 are visible only to the newer generation players. This ensures that the disks are backward compatible with the installed base of players.

Figure 2:
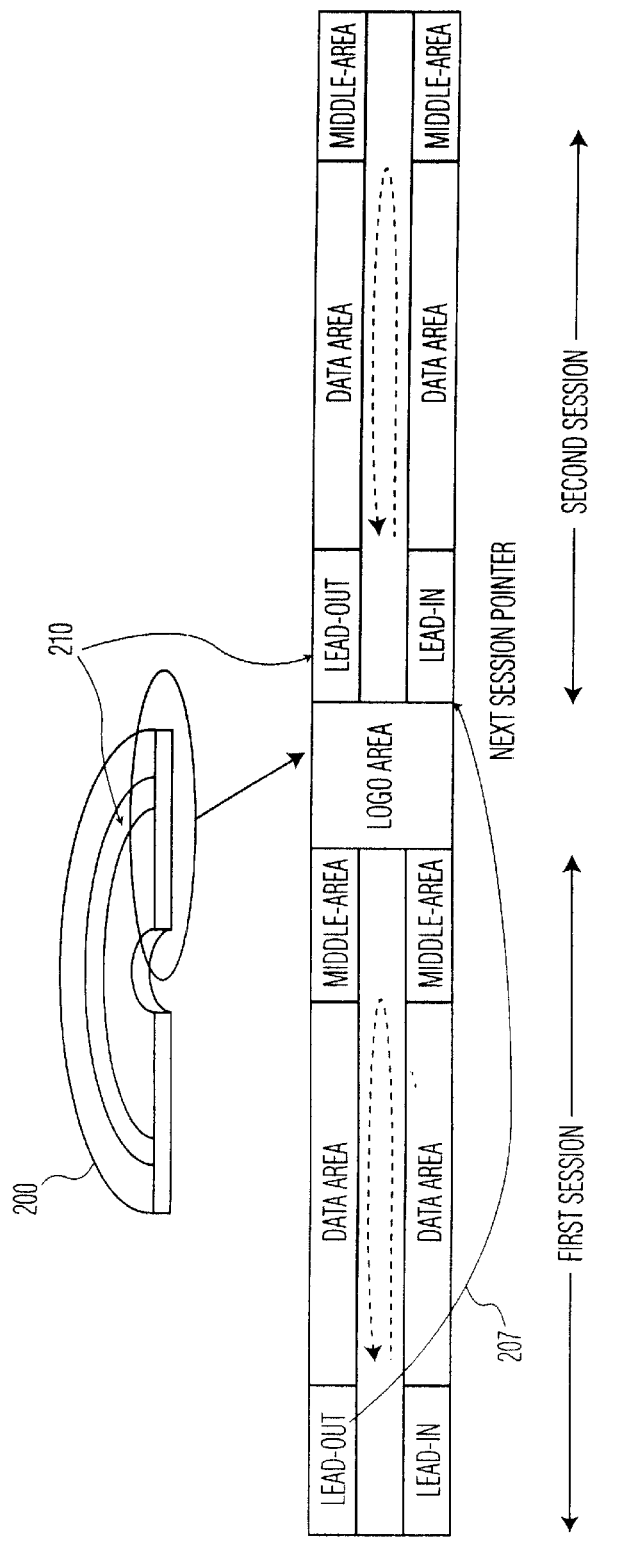
FIG. 2 is another example dual layer arrangement, optical storage disk made in accordance with an example embodiment of the present invention.

Referring now to FIG. 2, another example dual layer optical storage disk 200 is made in accordance with an example embodiment of the present invention. For the sake of brevity in the detailed description, elements in FIG. 2 that correspond to similar elements in FIG. 1 are not repeated or re-labeled. Differences between the figures are labeled with new reference numerals. In this particular example, the first and second logical disk are not contiguous to each other and are separated by a portion 210. In this example embodiment, portion 210 is a physical gap located between the first and second logical disks. Portion 210 does not include a metallic coating (e.g., aluminum) and is instead a clear ring that defines a "logo" area. This area is available for creative graphics and other illustrative test, printed thereon or programmed therein.

In an example embodiment, specifics such as properly programming the pointing data of pointer 207 enables the optical reader to skip over portion 210 to the lead-in region of the second logical disk. Therefore, disk 200 is readable from logical disk to logical disk without any effect from including portion 210. In a related embodiment, portion 210 is located in the inside portion of disk 200 near the disk aperture or at the perimeter of the disk. The pointing data is adjusted to accommodate the new location of portion 210.

In an example embodiment, a single layer DVD disk is programmable to include multiple logical disks that are contiguous and includes a pointer that indicates where the next logical disks commences. In related embodiment, the multiple logical disks on the single layer DVD need not be contiguous and the pointer is encrypted to limit the accessibility of other logical disks on the disk. In the various embodiments described in this application, each of the DVD disks can be configured to be read in a Parallel Track Pitch (PTP) format. Similarly, in other implementations of the present invention, the media contains a physical gap between non-contiguous logical disks, the physical gap being advantageously used to confuse non-authorized media players and/or to place a logo on the disk, as described above.

While the present invention has been described with reference to several particular example embodiments, those skilled in the art will recognize that many changes may be made thereto without departing from the spirit and scope of the present invention, which is set forth in the following claims.

What is claimed is:

1. A dual-layer data disk adapted to store data in each of two layers readable by an optical disk reader, the disk comprising:
a first region for a first logical disk and a second region for a second logical disk, each of the first and second regions located on the two layers and each of the data logical disks including a lead-in region followed by a data region and then by a lead-out region, wherein each of the lead-in and lead-out regions is adapted to store data respectively pointing to a region leading into and out of data stored in the respective data logical disk, and the lead-out region of the first logical disk is adapted to store pointing data that points to the lead-in region of the second logical disk, at least one of the first and second regions including data stored in the data region.

2. The dual-layer data disk of claim 1, wherein the pointing data of the lead-out region of the first logical disk is encrypted pointing data which, when un-encrypted, points to the lead-in region of second logical disk.

3. The dual-layer data disk of claim 2, wherein the first region includes recorded data readable by the optical disk reader as the first logical disk.

4. The dual-layer data disk of claim 3, wherein the second region includes recorded data readable by the optical disk reader as the second logical disk.

5. The dual-layer data disk of claim 3, wherein the second region does not include recorded data readable by the optical disk reader as the second logical disk, but is data writable for post-production recording of data as the second logical disk.

6. The dual-layer data disk of claim 1, wherein each of the first and second regions includes recorded data readable by the optical disk reader.

7. The dual-layer data disk of claim 1, wherein only one of the first and second regions includes recorded data readable by the optical disk reader, and whereas the other of the first and second regions does not include recorded data readable by the optical disk reader as the second logical disk, but is data writable for post-production recording of data as another logical disk.

8. The dual-layer data disk of claim 7, wherein said at least one of the first and second regions includes data recorded in an opposite-track-path format readable by the optical disk reader.

9. The dual-layer data disk of claim 1, wherein at least one of the first and second regions includes data recorded in an opposite-track-path format readable by the optical disk reader.

10. The dual-layer data disk of claim 9, further including a separator region physically between the first and second regions.

11. The dual-layer data disk of claim 10, wherein the separator region includes a logo.

12. The dual-layer data disk of claim 1, wherein at least one of the first and second regions includes data recorded in a format that is readable by the optical disk reader from an inner area of the disk toward an outer area of the disk, and wherein the other of the first and second regions includes data recorded in a format that is readable by the optical disk reader from an outer area of the disk toward an inner area of the disk.

13. The dual-layer data disk of claim 1, wherein at least one of the first and second regions includes digital-audio data recorded in a format that is readable by the optical disk reader.

14. The dual-layer data disk of claim 13, wherein the other of the first and second regions includes recorded data that is not digital-audio data.

15. The dual-layer data disk of claim 13, wherein the other of the first and second regions includes recorded data that is also digital-audio data readable by the optical disk reader.

16. The dual-layer data disk of claim 1, wherein at least one of the first and second regions includes data recorded in a format that is readable by the optical disk reader from an inner area of the disk toward an outer area of the disk, and from an outer area of the disk toward an inner area of the disk.

17. The dual-layer data disk of claim 1, wherein at least one of the first and second regions includes data recorded in a parallel-track-path format readable by the optical disk reader.

18. A dual-layer data disk adapted to store data in each of two layers readable by an optical disk reader, the disk comprising:
a first region for a first logical disk and a second region for a second logical disk, each of the first and second regions being located on the two layers and each of the logical disks including a lead-in region and a lead-out region and, therebetween, a data region, each of the lead-in and lead-out regions storing data respectively pointing to a region leading into and out of data stored in the respective data logical disk, and the lead-out region of the first data logical disk storing encrypted pointing data which, when unencrypted, points to the lead-in region of second logical disk; only one of the first and second regions including recorded data readable by the optical disk reader, and the other of the first and second regions not including recorded data readable by the optical disk reader as the second data logical disk but being adapted and preserved for subsequent post-production recording of data as another data logical disk.

19. The dual-layer data disk of claim 18, wherein said only one of the first and second regions includes data recorded in a format that is readable by the optical disk reader from an inner area of the disk toward an outer area of the disk, and from an outer area of the disk toward an inner area of the disk.

20. The dual-layer data disk of claim 18, wherein each of the first and second regions is adapted for an OTP DVD media format.

21. The dual-layer data disk of claim 18, wherein one of the first and second regions is adapted for an OTP DVD media format.

22. The dual-layer data disk of claim 18, wherein the second region is adapted for a 'reverse PTP' DVD media format, in which the second logical disk includes two logical disks, each read from the inner diameter to the outer diameter.

23. The dual-layer data disk of claim 18, wherein said only one of the first and second regions includes data recorded in a format that is readable by the optical disk reader from an inner area of the disk toward an outer area of the disk, and from an outer area of the disk toward an inner area of the disk.

24. A dual-layer data disk adapted to store data in each of two layers readable by an optical disk reader, the disk comprising:

a first region for a first logical disk and a second region for a second logical disk, each of the first and second regions located on the two layers and each of the data logical disks including a lead-in region followed by a data region and then by a lead-out region, wherein each of the lead-in and lead-out regions is adapted to store data respectively pointing to a region leading into and out of data stored in the respective logical disk, and the lead-out region of the first logical disk is adapted to store pointing data that points to the lead-in region of the second data second logical disk, at least one of the first and second regions including data stored in the data region.

* * * * *